Jan. 5, 1937.  N. H. GAY  2,066,832
HUMIDIFYING AND TEMPERATURE CONTROL APPARATUS
FOR CITRUS FRUIT STORAGES AND LIKE STRUCTURES
Filed March 1, 1935   2 Sheets-Sheet 2
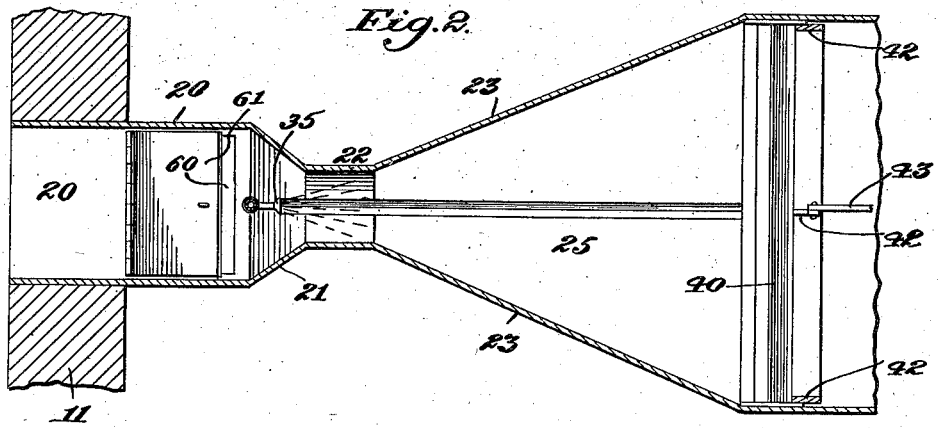
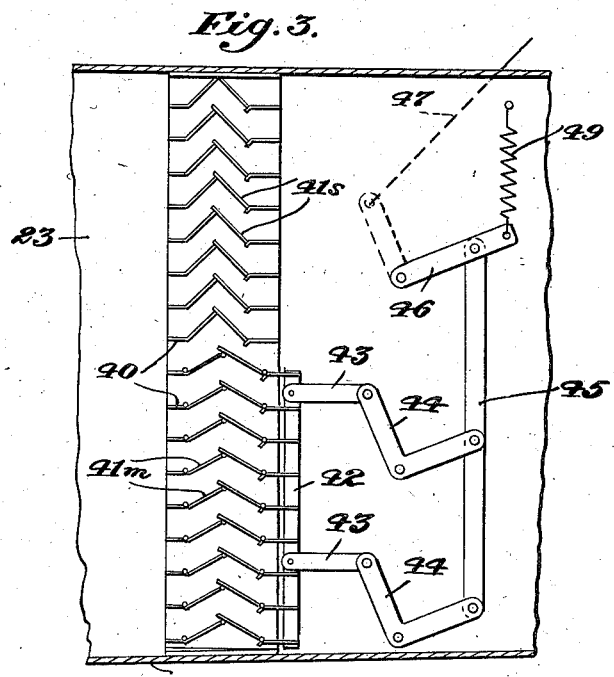
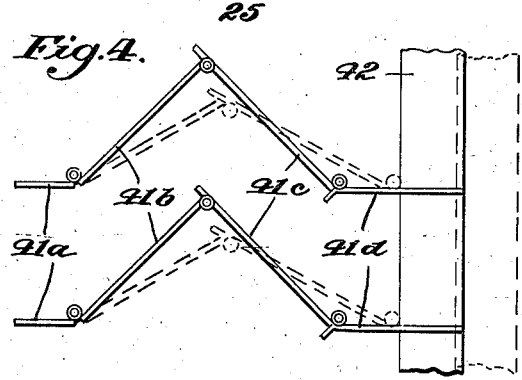
Inventor:
Norman H. Gay,
by Sturtevant & Mason
Att'ys.

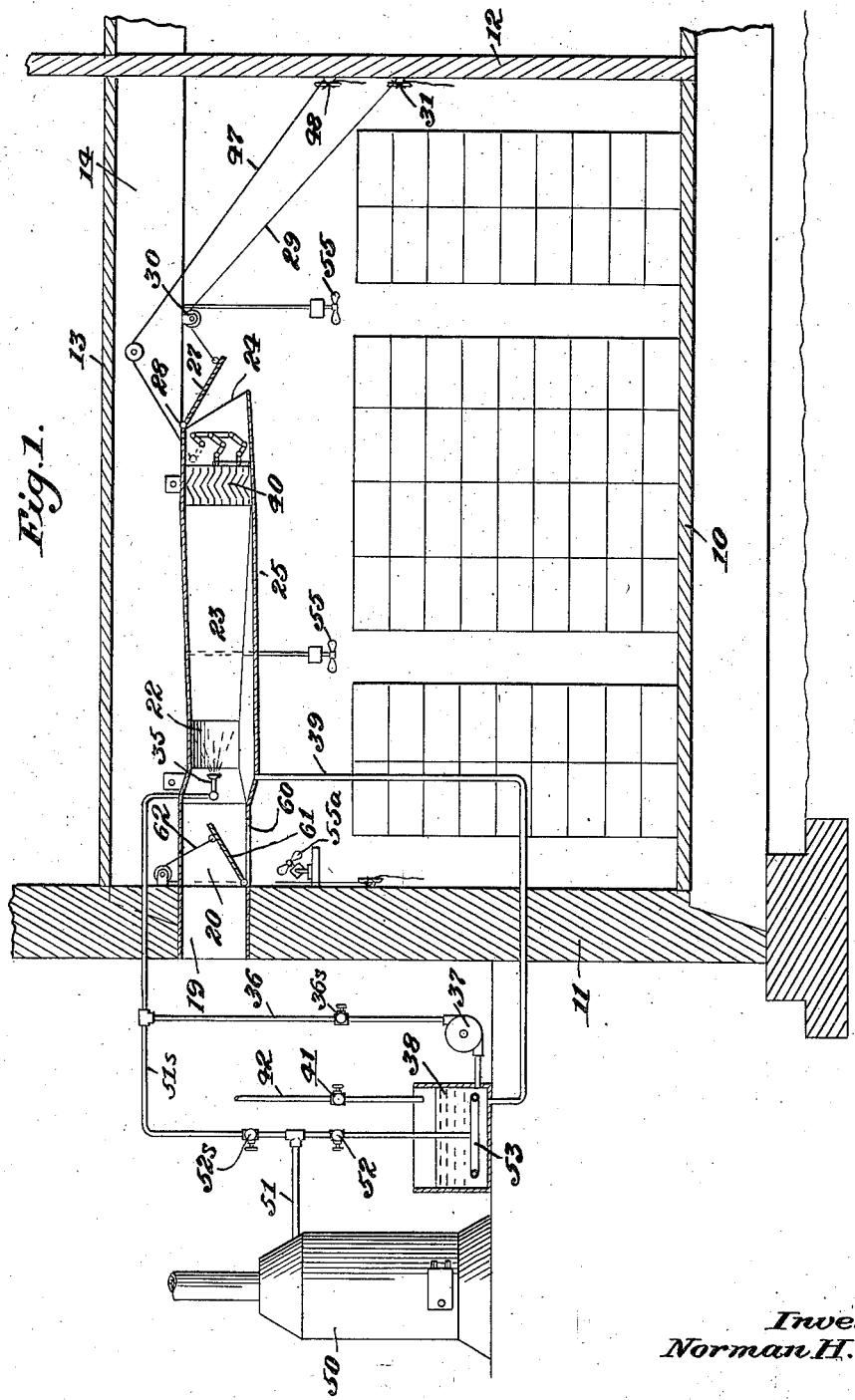

Patented Jan. 5, 1937

2,066,832

UNITED STATES PATENT OFFICE 2,066,832

HUMIDIFYING AND TEMPERATURE CONTROL APPARATUS FOR CITRUS FRUIT STORAGES AND LIKE STRUCTURES

Norman H. Gay, Los Angeles, Calif.

Application March 1, 1935, Serial No. 8,967

6 Claims. (Cl. 183—22)

The present invention relates to an apparatus for the controlled storage of citrus fruits and like articles, and more particularly to humidifying and/or temperature control means in such apparatus by which a proper degree of humidity and a desired temperature is maintained therein consonant with the demands of the articles being stored.

One of the features of the present invention is the provision of a simple apparatus having cheaply constructed and arranged devices which operate for controlling the humidity and/or temperature, such devices being located at a part of the apparatus where they are readily installed and are accessible for inspection and repair and in which they do not present an encumbrance to the storage space in said structure.

Another feature of the present invention is the provision of a storage structure having humidifying and/or temperature control means therein which is operative during the summer or warmer season for controlling the humidity and/or temperature under regulatable conditions, and which is operable during the winter or cooler season for controlling the humidity, and also for producing a warming effect in the structure, if so desired.

A further feature of the present invention is the provision of humidifying and/or temperature control means for the storage structure which is of simple and readily constructed form, is mountable in a non-encumbering position in the structure, and which includes a regulating device operating for diverting or deflecting the circulating air over the contents of the structure.

With these and other objects in view, as will appear in the course of the following specification and claims, an illustrative form of practicing the invention is shown on the accompanying drawings, in which:

Figure 1 is an upright sectional view through a storage structure showing a humidifying and temperature control means located therein.

Figure 2 is a horizontal section through the humidifying means.

Figure 3 is a detail view of a part of Fig. 2, on a larger scale, showing an eliminator structure to permit fogging of the air issuing from the vanes.

Figure 4 is a diagrammatical view, on a still larger scale, showing the operation of the eliminator vanes.

Lemons, for example, normally are picked in California during the months of March, April and May. The largest quantity of lemons comes to the proper size for picking during these months. Since the greatest demand for lemons is during the hot months of June, July, August and September, it is desirable to hold over these lemons for three or four months or until the demand uses up the supply to a reasonable extent. The usual practice is to store the lemons in a cool basement room. As long as the room remains cool and well ventilated, the lemons seem to hold in reasonably good condition. There is a certain amount of evaporation of moisture from the skin of the lemon, which evaporation assists in keeping the lemons cool.

If the room becomes heated to temperatures of 60 degrees or over, the lemons ripen very rapidly, giving $CO_2$ gas and other vapors. This forming of $CO_2$ gas causes the lemon to heat and to ripen still more rapidly, at the same time giving off gases and spores which tend toward increasing and spreading of decay throughout the entire volume of lemons stored. Varying amounts of $CO_2$ gas, vapor and spores are given off by the lemons regardless of temperature, and if gases, vapors and spores are not removed from the basement as rapidly as they are formed, decay and loss of the lemons is entailed. It is therefore important that proper ventilation be given the lemon storage rooms continuously.

If the fresh air supplied to the lemons is normally dry outside air, the tendency is for this air to pick up moisture from the lemons, causing them to shrivel and lose weight. For this reason the air used for ventilating should be humidified as much as possible. Since the decay and gassing of the lemons proceeds more rapidly at the higher temperatures, it is also advantageous to supply a certain amount of refrigeration to cool the air which is supplied to the lemons. Such refrigeration may be produced artificially but a substantial degree of refrigeration may be produced by natural means in taking advantage of the lower outside wet bulb temperatures by spraying air from the outside of the general structure with water which is at the same temperature or which has been cooled by natural evaporation therefrom in any of the usual ways.

Normally, it is desirable in order to maintain temperatures and humidity to circulate about five times the amount of air through the humidifying tube which would be required for proper ventilation. In other words, normally one part of the air will be fresh air and four parts will be re-circulated air.

In the drawings, the storage structure is illustrated as being the lower floor or basement of a storage warehouse having a tight floor 10, an external wall 11, an internal bulkhead wall 12, and a tight ceiling 13 which is illustrated as being formed by the floor above. This floor is supported by the joists 14.

The humidifying means comprises sheet metal walls having a straight portion 19 passing through the external wall 11 of the building, so that external air may be drawn into the humidifying means. Joined to this straight portion 19 is a straight section 20 and a convergent portion 21 leading to a Venturi throat 22. The divergent portion 23 extends from the throat and terminates at an opening 24 which communicates with the chamber of the storage structure. It is preferred that the vertical walls of the duct thus formed at the opening 24 should be inclined downwardly and away from the throat 22. It will be noted that the duct is formed with a straight axis so that the minimum resistance is opposed to the movement of air through this duct.

A damper 27 is mounted by a hinge structure 28 providing a horizontal axis adjacent the top of the duct, so that this damper may move downward by gravity and seal the opening 24. An adjusting chain or cord 29 is connected to the lower edge of the damper and passes over a guide pulley 30 attached to the joist 14 and may be held at any adjusted position by a cleat 31 or other suitable device. The weight of the damper 27 is sufficient to hold it in its adjusted position regardless of the velocity and pressure of the air passing through the duct.

A spray nozzle 35 is provided adjacent the Venturi throat 22 and is connected by a pipe 36 with a pressure pump 37 for withdrawing water from a sump 38 and delivering it at a pressure of, say, 30 to 40 pounds at the spray nozzle.

The bottom wall 25 of the duct is provided with a collecting gutter for excess water which is deposited in the duct, permitting it to pass by a discharge pipe 39 back into the sump 38.

A water eliminator 40 is preferably provided in the duct adjacent the opening 24 thereof, and the water separated in this eliminator likewise flows back along the bottom wall and through the conduit 39.

The water eliminator 40 is preferably provided with a plurality of metal sections providing surfaces directed at an angle to the direction of flow of air through the duct. One or more of the metal sections are preferably hinged. Thus, in Figs. 3 and 4, the upper sections 41s are stationary, while the lower sections 41m are movable. These movable sections (Fig. 4) preferably include the flat inlet pieces 41a which are fixed to the eliminator frame. To each of these pieces is hinged a first-moving section 41b, and to the latter is hinged a second-moving section 41c, this latter section 41c being joined by a section 41d to a pull bar 42. The pull bar is slidable horizontally in the duct and is connected by links 43 with the crank levers 44 which are joined by links 45 to a crank lever 46 having one arm extending externally of the duct and connected to a cable or cord 47 which may be adjustingly secured to a cleat 48. A coil spring 49 may be utilized in conjunction with the cable for determining the position of the pull bar 42 and thus determining the relative position of the several movable vanes or sections. When in a relatively straightened position shown in dotted lines, they are disposed at a lesser angle to the direction of flow of humidified air so that they present less resistance and less effective surfaces for capturing and removing particles of unvaporized liquid, so that the issuing air is highly humidified and usually is in a condition which may be denominated "foggy". This air, highly loaded with water, is employed for rapidly increasing the humidity of the air within the apartment and is particularly advantageous when it is necessary to raise the humidity rapidly. When the sections are removed to the position shown in full lines in Fig. 4, their effective surface is increased and they present a more effective means for removing the water particles and hence air is less highly charged. By a proper regulation, any desired degree of humidification may then be effected.

The level of water in the sump 38 is controlled by operating the valve 41 in the pipe 42 for make-up water.

During the winter season, a steam boiler 50 supplies steam into a pipe 51 under control of a valve 52 and to a jet coil 53 for maintaining the water in the sump at a desired temperature.

Steam may also be applied directly to the pipe 36 and nozzle 35 (Fig. 2) through a steam pipe 51s and under control of the valve 52s to increase the heating effect by raising the temperature of the surfaces presented by the divergent portion 23. Under these conditions, it is preferred to accelerate the air movement and to cause the heated air to move downwardly by the provision of one or more fans 55 which are advantageously located above flues which are left in stacking the crates of fruit, thus increasing the heat transfer from the duct to the air throughout the apartment. The rapidity of air movement over the outer surface of the duct is thus accelerated and a greater heat transfer effected so that the introduced steam and water yield off their heat content more rapidly. This is particularly advantageous during the winter season when the duct is maintained at a higher temperature than the air in the storage structure. The positions of the fans are preferably adjusted so that the fans are employed to blow the air over the duct and through the fruit, to effect a proper circulation of the air through the apartment.

The refluxing conduit 60 communicates with the interior of the storage chamber so that air from this chamber may be re-circulated past the nozzle 35. To regulate the proportion of external and internal air which is admitted to the nozzle 35, a damper valve 61 may be utilized under control by the cable or cord 62. When only external air is employed in summer, the temperature of the air and water leaving the Venturi throat quickly adjust themselves substantially to the wet bulb temperature of the outside air; which is of particular advantage in climates with low dew points, such as in the Pacific Coast citrus fields, as the cool night temperature then gives the desired temperature and humidity conditions for citrus storage rooms.

During the summer season, the damper 27 is adjusted to a position of, say, 45 degrees, and the pump 37 is caused to deliver water under pressure to the spray nozzle 35. The injector action thus occurring at the Venturi throat causes the movement of air from the exterior through the duct, establishing a desired humidity therein, and finally it is diverted or deflected downwardly by the damper 27 so that it is caused to pass, by reason of its kinetic energy, downwardly and into contact with the crates of citrus fruit or other articles located in the chamber. It will be understood that humid air is lighter at a given temperature than drier air, and hence this deflection assures a proper downward movement of the incoming air. The proportion of air admitted is controlled by regulating the position of the damper 27. This damper 27 operates as a control means at the outlet end of the duct and causes a deflection of a small volume of air through a greater downward angle than a large volume—a condition which assures adequate ventilation and avoids "short circuiting" without the passage of the conditioned air around and through the contents of the compartment.

If the air becomes too moist, the recycling control damper 61 may be moved toward a more closed position with respect to conduit 60 and a more open position with respect to the portion 20, and thus more of the external air is moved into the chamber. Vice versa, if the air is too dry, a greater proportion of recirculated air is caused to move by corresponding adjustment of the control damper 61.

During the winter season, the water in the sump 38 may be heated by steam from the boiler 50 and thus the spray water heats the air in the duct and also the duct walls. As stated above, steam may be admitted directly to the nozzle 35s in the diverging section 23 and in addition the water from the spray nozzle 35 is heated by condensing such admitted steam. A high sensitiveness of regulation may be effected by regulating the quantity of water admitted in proportion to the steam to determine the temperature of the air within the duct, regardless of whether this air is permitted to escape past the damper 27 or is held within the duct while the same is being employed simply as a heating radiator. The damper 27 is usually moved to a more closed position than during the warmer season or closed entirely, so that less air is admitted into the chamber and a greater or less quantity of water can thus be employed at the spray nozzle with the same quantity of air being admitted into the chamber from the opening 24, when using the steam coil at the sump. This water carries with it from the pump 37 the heat which has been imparted to it in the sump 38, and hence the duct operates as a radiator; and when fans 55 are used, the general circulation of the heated air, regardless of the amount of moisture present, occurs through the chamber. The heating and humidity can now be controlled by proper adjustments of the dampers 27 and 61.

It will especially be noted that the duct structure can be formed of sheet metal in a very cheap and convenient manner and is attached at the ceiling of the storage compartment, so that it does not encumber or obstruct storage in the storage chamber space. It is readily accessible for inspection and repair, and the control of humidity conditions is easily attained by simple and effective dampers. During the season when heating is employed, the air from the fan 55a is directed over the hot bottom wall 25 to abstract heat rapidly therefrom.

As stated above, by control of the eliminator surfaces it is possible to regulate the amount of water which is carried by the air, the vaporized water being sufficient to charge the air to a 100 percent humidity and in addition thereto it is possible to cause this air to carry water droplets in the form of fog into the structure at times when it is desirable to add moisture to the air throughout the storage apartment more rapidly than can be effected by giving the air, as discharged from the duct at damper 27, a humidity of 100 percent. For this purpose, a control cable 47 is connected to the lever system which operates the adjustable eliminator sections.

It will be understood that when fresh air is admitted, an equivalent quantity is permitted to escape through normal leakage or through an especial discharge duct (not shown).

It is obvious that the invention is not limited solely to the form of construction shown but that it may be modified in many ways within the scope of the appended claims.

Having thus described the invention, what I claim as new and desire to secure by Letters Patent, is:

1. An air conditioning device comprising a horizontal duct having convergent and divergent walls providing a Venturi throat, said duct having open ends and a straight axis of symmetry whereby to avoid conduit friction losses, a spray nozzle located at said Venturi throat and directed horizontally toward the outlet end of the duct collection means included in said duct for removing excess water deposited from the air in said duct, the bottom of the duct being constructed and arranged to provide a sump for receiving said excess water, pump means for supplying water under pressure from said sump to said nozzle to cause the movement of air through said duct, means for heating the water, and damper means for controlling the outlet of air from the end of the divergent portion of the duct and operating to deflect a small volume of air through a greater downward angle than a larger volume.

2. An air conditioning device comprising a duct having convergent and divergent walls providing a Venturi throat, said duct having open ends and a straight axis of symmetry whereby to avoid conduit friction losses, a spray nozzle located at said Venturi throat and directed horizontally toward the outlet end of the duct, collection means included in said duct for removing excess water deposited from the air in said duct, a sump for receiving said water, pump means for supplying water under pressure from said sump to said nozzle to cause the movement of air through said duct, and control damper means, at the outlet end of the duct operating to deflect a small volume of air through a greater downward angle than a larger volume.

3. A storage structure for citrus fruit and like articles, comprising walls providing a substantially closed chamber, a duct having an outer opening to the exterior of said walls and an inner outlet opening into said chamber and located in a substantially horizontal position adjacent the ceiling of said chamber, said duct having a restricted portion forming a Venturi throat and having a sloping bottom to provide collecting means for excess water deposited between said Venturi throat and the inner opening, a spray nozzle located at said Venturi throat and directed horizontally toward the outlet end of the duct, means for supplying water under pressure to said nozzle to cause the movement of air through said duct in the chamber, a damper pivoted at said inner opening for movement about a horizontal axis located near the top of the duct outlet and operative when open as a deflector for diverting air from said duct downwardly into said chamber, and means for adjusting said damper.

4. A humidifying and temperature control apparatus for storage of citrus fruits and like articles, comprising walls providing a substantially closed chamber, a horizontal duct located near the ceiling of the chamber and having an inlet communicating with the atmosphere outside said chamber and a second inlet in said duct also communicating with said chamber, said duct also having at its inner end an outlet communicating with said chamber, means for controlling the relative proportion of air from the atmosphere and air from the chamber which is admitted at said second inlet, means at the outlet end for controlling the flow of air from said outlet, humidifying means including water supplying means in said duct, and water eliminating means adjacent the outlet operative to remove an excess of water from the air.

5. A humidifying and temperature control apparatus for storage of citrus fruits and like articles, comprising walls providing a duct having an inlet and an outlet, a spray nozzle, a source of steam, regulatable means for delivering steam from said source to said nozzle, a water sump and regulatable means for heating the same from said source of steam, a pump and connections for delivering water under pressure from said sump to said nozzle, a conduit for returning water from said duct to said sump, regulatable means for controlling and shutting off the flow of air through said outlet, and air circulating means for moving air through and over said duct.

6. A humidifying and temperature control apparatus for storage of citrus fruits and like articles, comprising walls providing a duct having an inlet and an outlet, a spray nozzle and means connected therewith capable of supplying atomized water therethrough to the air in the duct to effect a super-saturation of the air so that water droplets are suspended therein, and a water eliminator for removing water from the air in the duct and comprising pairs of sections pivoted together, one section being pivotally carried from the duct, and adjusting means connected to the other section for causing folding and opening movements of the sections of each pair.

NORMAN H. GAY.